United States Patent [19]
Matsuda et al.

[11] Patent Number: 5,952,993
[45] Date of Patent: *Sep. 14, 1999

[54] VIRTUAL OBJECT DISPLAY APPARATUS AND METHOD

[75] Inventors: Keigo Matsuda; Takahiro Harashima; Naoko Umeki; Miwako Doi, all of Kanagawa-ken, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,429

[22] Filed: Aug. 22, 1996

[30] Foreign Application Priority Data

Aug. 25, 1995 [JP] Japan .................................. 7-216987

[51] Int. Cl.$^6$ ........................................ G09G 5/34
[52] U.S. Cl. ........................ 345/121; 345/428; 345/473
[58] Field of Search .................................. 345/121, 122, 345/123, 126, 127, 129, 130, 131, 112, 113, 114, 4, 5, 6, 7, 8, 428, 429, 427, 419, 473; 364/521; 273/437; 395/129

[56] References Cited

U.S. PATENT DOCUMENTS

| | | | |
|---|---|---|---|
| 4,670,745 | 6/1987 | O'Malley et al. ...................... | 345/123 |
| 4,815,010 | 3/1989 | O'Donnell ............................... | 364/521 |
| 5,423,554 | 6/1995 | Davis ...................................... | 273/437 |
| 5,442,734 | 8/1995 | Murakami et al. ..................... | 345/427 |
| 5,490,239 | 2/1996 | Myers ..................................... | 395/129 |
| 5,577,960 | 11/1996 | Sasaki .................................... | 345/428 |
| 5,579,026 | 11/1996 | Tabata ...................................... | 345/8 |
| 5,684,943 | 11/1997 | Abraham et al. ...................... | 345/121 |

OTHER PUBLICATIONS

Badler, Norman I. et al., "Articulated Figure Positioning by Multiple Constraints", IEEE, pp. 28–31, 1987.
Wernecke Josie, "The Inventor Mentor", SoLevelOfDetail, Chapter 3: Nodes and Groups, Creating Groups, pp. 52–53, 1994.

Primary Examiner—Chanh Nguyen
Assistant Examiner—John Suraci
Attorney, Agent, or Firm—Finnegan, Henderson, Farabow, Garrett, Dunner, L.L.P.

[57] ABSTRACT

A virtual object display apparatus displays the action of an object at high speed. An environment information memory section stores environment information of a plurality of objects in a virtual space. A view information memory section stores view information of an extent of a view area of the virtual space. A visibility decision section determine whether each of the plurality of objects is visible in the view area in accordance with the environment information and the view information. An motion generation section generates motion for each of the objects in the virtual space in accordance with a decision result of the visibility decision section. A display section displays the motion of each of the objects generated by the action generation section.

17 Claims, 18 Drawing Sheets

| VIEW POINT COORDINATE | REFERENCE POINT COORDINATE | HORIZONTAL VIEW ANGLE | VERTICAL VIEW ANGLE | DISTANCE BETWEEN THE VIEWPOINT AND THE NEARER CLIPPING PLANE | DISTANCE BETWEEN THE VIEWPOINT AND THE NEARER CLIPPING PLANE |
|---|---|---|---|---|---|
| $P_v(X_v, Y_v, Z_v)$ | $P_r(X_r, Y_r, Z_r)$ | $A_h$ | $A_v$ | $D_n$ | $D_f$ |

FIG. 2

| ELEMENT NAME | POSITION | POSTURE | POINTER TO FIGURE INFORMATION | PARENT NAME |
|---|---|---|---|---|
| ELEMENT 1 | $X_1, Y_1, Z_1$ | $a_1, e_1, r_1$ | $P_1$ | WORLD |
| ELEMENT 2 | $X_2, Y_2, Z_2$ | $a_2, e_2, r_2$ | $P_2$ | ELEMENT 1 |
| ... | ... | ... | ... | ... |

*FIG. 4*

| ELEMENT NAME | | PARENT NAME |
|---|---|---|
| BODY | | WORLD |
| HEAD | - - - - - - - - - | BODY |
| LEFT UPPER ARM | | BODY |
| LEFT LOWER ARM | | LEFT UPPER ARM |
| ⋮ | | ⋮ |

| ADDRESS | FIGURE INFORMATION ||| |
| --- | --- | --- | --- |
| | POLYGON NAME | PEAK COORDINATE | COLOR INFORMATION |
| $P_1$ | POLYGON 11 | VERTEX 111 $(X_{111}, Y_{111}, Z_{111})$ | $R_{11}, G_{11}, B_{11}$ |
| | | VERTEX 112 $(X_{112}, Y_{112}, Z_{112})$ | $R_{12}, G_{12}, B_{12}$ |
| | | ... | ... |
| | POLYGON 12 | VERTEX 121 $(X_{121}, Y_{121}, Z_{121})$ | ... |
| $P_2$ | ... | ... | ... |

*FIG. 7*

```
OBJ 1:
    ROTX    30RPM

HUMAN 1:
    WALK 30STEP
    TURN LEFT 90DEG
    LOOKAT OBJ 1
    WAIT 10SEC
        ⋮
```

VIRTUAL OBJECT DISPLAY APPARATUS AND METHOD

BACKGROUND OF THE INVENTION

1. Field of the Invention

The present invention relates to a virtual object display apparatus and method to display motions of objects, including humans at high speed usings computer-graphics system.

2. Description of the Related Art

Conventionally, in the case of displaying action of an object, having plural elements connected by a link structure, using computer-graphics, calculation of inverse-kinematics or physical rules is executed for each object. If the motion of the object is displayed at real time while the motion of the object is simulated, the calculation-load causes a decrease of an update-rate of drawing the motion of the object on the display screen in proportion to a number of the objects.

In such a case, a human model or a model of some other living things is represented as an object composed of a plurality of elements (a head, a body, a right arm, a left arm, a right hand, a left hand, a right leg, a left leg, a right foot, a left foot). The plurality of elements are connected by a link structure. Therefore, in the case of displaying the action of the object by computer-graphics, a few objects or simple actions of the object are only displayed because of the above-mentioned calculation-load.

In the case of displaying a lot of objects, it is impossible to draw coordinate points of the objects on the display screen in real time. In this case, drawing of the objects is executed by unit of frame in non-real time. After creating all frames, the user watches the frames by playing as a video image. However, in this method, it is impossible for the user to interactively designate an motion of the object on the display screen. For example, in the case of simulation-display of the flow of a lot of humans in the street, it is only possible for the user to watch the action of many humans without interactive designation.

In short, in the case of displaying the action of a lot of objects using computer-graphics, it takes a long time to draw the motion of a lot of objects on the display screen because of the calculation-load of the motion of each object. Therefore, it is impossible for the user to watch the motion of the objects in real-time.

SUMMARY OF THE INVENTION

It is an object of the present invention to provide a virtual object display apparatus and method to suitably display the motion of objects in real-time according to user's view information.

According to the present invention, there is provided a virtual object display apparatus, comprising: environment information memory means for storing environment information, including position, of a plurality of objects in a virtual space; view information memory means for storing view information of the extent of a view area from a viewpoint in the virtual space; visibility decision means for determining whether each of the plurality of objects is visible from the viewpoint in accordance with the environment information and the view information; motion generation means for generating motion for each of the plurality of objects in the virtual space in accordance with a decision result of the visibility decision means; and display means for displaying the motion of each of the objects generated by the motion generation means.

Further in accordance with the present invention, there is provided a virtual object display apparatus, comprising: environment information memory means for storing environment information of a plurality of objects in a virtual space; view information memory means for storing view information of the extent of a view area from a viewpoint in the virtual space; attention degree calculation means for calculating an attention degree for each of the plurality of objects in accordance with the environment information and the view information; motion generation means for generating action for each of the plurality of objects in the virtual space in accordance with the attention degree calculated by the attention degree calculation means; and display means for displaying the action of each of the objects generated by the action generation means.

Further in accordance with the present invention, there is provided a virtual object display method, comprising the steps of: storing environment information, including position, of a plurality of objects in a virtual space; storing view information of the extent of a view area in the virtual space; deciding whether each of the plurality of objects is visible in the view area in accordance with the environment information and the view information; generating motion for each of the objects in the virtual space in accordance with a decision result at the deciding step; and displaying the action of each of the the objects generated at the generating step.

Further in accordance with the present invention, there is provided a virtual object display method, comprising the steps of: storing environment information of a plurality of objects in a virtual space; storing view information of the extent of a view area in the virtual space; calculating an attention degree for each of the plurality of objects in accordance with the environment information and the view information; generating motion for each of the plurality of objects in the virtual space in accordance with the attention degree calculated at the calculating step; and displaying the motion of each of the objects generated at the generating step.

Further in accordance with the present invention, there is provided a computer-readable memory comprising: instruction means for causing a computer to store environment information, including position, of a plurality of objects in a virtual space; instruction means for causing a computer to store view information of the extent of a view area in the virtual space; instruction means for causing a computer to determine whether each of the plurality of objects is visible in accordance with the environment information and the view information; instruction means for causing a computer to generate motion for each of the objects in the virtual space in accordance with a result of the visibility determination; and instruction means for causing a computer to display the generated motion of each of the objects.

Further in accordance with the present invention, there is provided a computer-readable memory comprising: instruction means for causing a computer to store environment information of a plurality of objects in a virtual space; instruction means for causing a computer to store view information of the extent of a view area in the virtual space; instruction means for causing a computer to calculate an attention degree for each of the plurality of objects in accordance with the environment information and the view information; instruction means for causing a computer to generate motion for each of the plurality of objects in the virtual space in accordance with the attention degree; and instruction means for causing a computer to display the generated motion of each of the object.

BRIEF DESCRIPTION OF THE DRAWINGS

FIG. 2 is a schematic diagram of content of view information.

FIG. 4 is a schematic diagram of content of environment information.

FIG. 7 is a schematic diagram of content of figure information.

DETAILED DESCRIPTION OF THE PREFERRED EMBODIMENTS

Embodiments of the present invention are described below with reference to the drawings.

Figure 1:
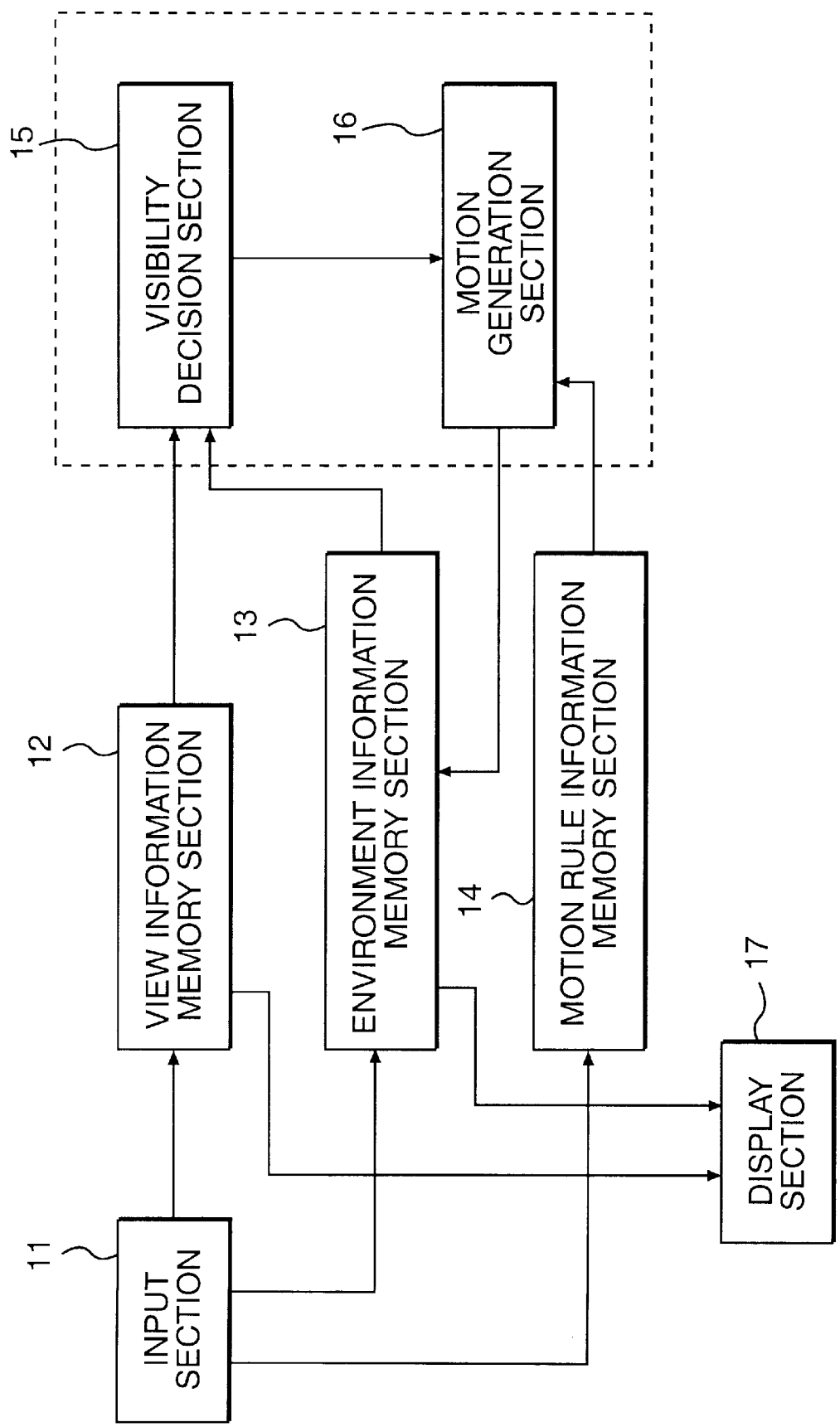
FIG. 1 is a schematic diagram of a first embodiment of the present invention.

FIG. 1 is a schematic diagram of a virtual object display apparatus according to a first embodiment of the present invention. The virtual object display apparatus of the first embodiment includes an input section 11, a view information memory section 12, an environment information memory section 13, an motion rule information memory section 14, a visibility decision section 15, an motion generation section 16 and a display section 17.

Figure 3:
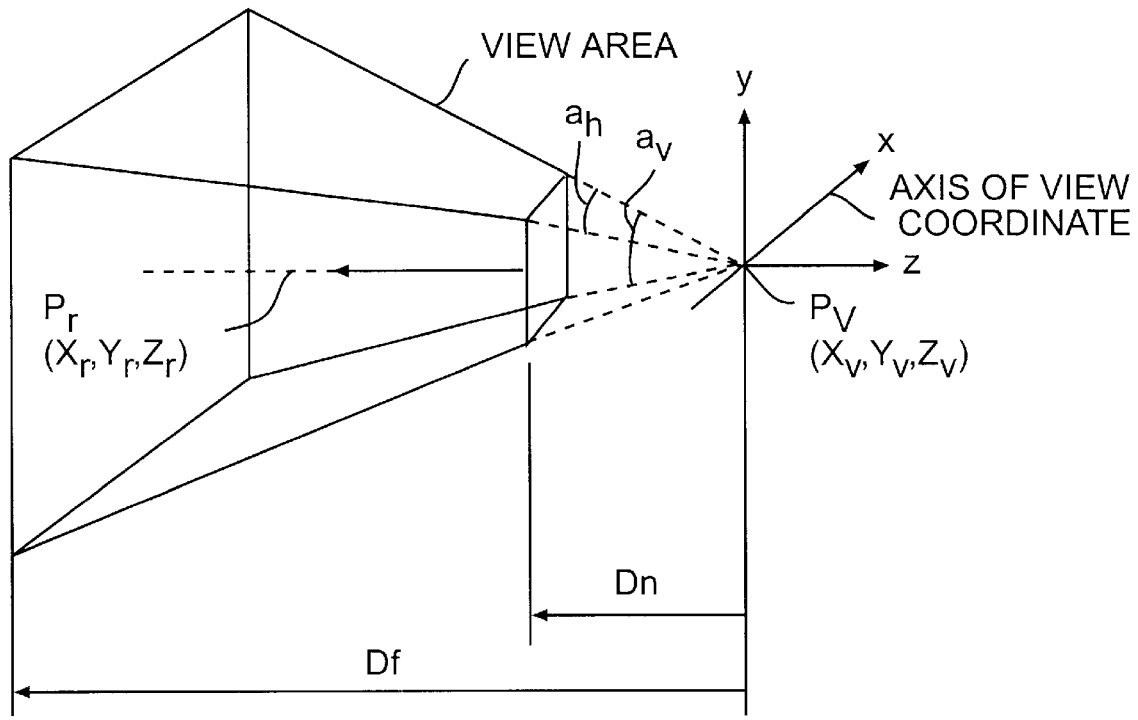
FIG. 3 is a schematic diagram of a view area defined by the view information.

First, the view information for visible objects in a virtual environment and environment information of the objects in the virtual environment are supplied through the input section 11. The view information memory section 12 stores the view information. FIG. 2 is a schematic diagram of content of the view information. The view information includes of a view point coordinate, a reference point coordinate, a horizontal view angle, a vertical view angle, the distance between the viewpoint and the nearer clipping plane and the distance between the viewpoint and the farther clipping plane in view coordinate space. FIG. 3 is a schematic diagram of the view area defined by the view information shown in FIG. 2. The view area is represented as a quadrangular pyramid based on axes of view coordinates in FIG. 3. In short, the view area corresponds to the view perceived by the eyes of the user.

Figures 5, 6:
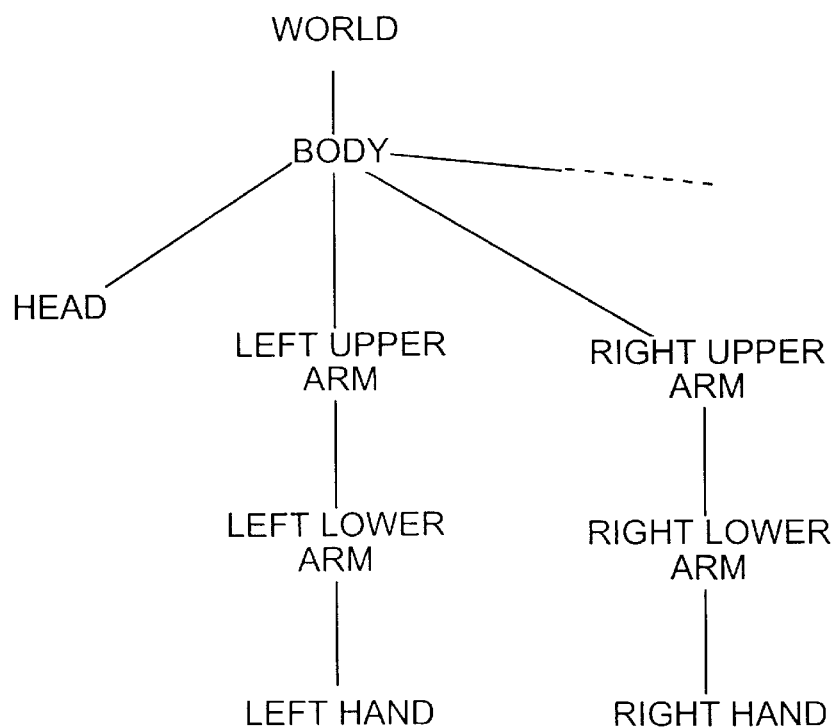
FIG. 5 is an example of object elements of the environment information.
FIG. 6 is an example of a tree structure of the object elements.

The environment information memory section 13 stores the environment information of the objects. FIG. 4 is a schematic diagram of content of the environment information. The environment information includes an element name, a position, posture, a pointer to figure information and a parent (element) name. In FIG. 4, the elements are the parts of which one object consists. Examples of objects are a human, desk, chair and so on. With respect to elements, in the case of a human, for example, the each elements can be the head, body, left arm, left hand, right arm, right hand, left leg, left foot, right leg, right foot. The environment information of each element includes the parent element and all elements of one object are connected by physical connection relations (tree-structure). FIG. 5 is a schematic diagram of the relation between element name and parent name in the case of a human. FIG. 6 is a schematic diagram of a tree-structure of the elements forming a human model. In this example, the body is a center element, and other elements (head, arm, leg) are connected to the body. In short, the element whose parent is "WORLD" is the center element of the object. Each object includes one center element. The position and the posture of the environment information are values in the local coordinates of the parent element. FIG. 7 is a schematic diagram of content of figure information. The figure information includes a polygon name, vertexes and color information of each polygon. A pointer to figure information in FIG. 4 corresponds to the address of each item of figure information in FIG. 7.

Figures 8, 9:
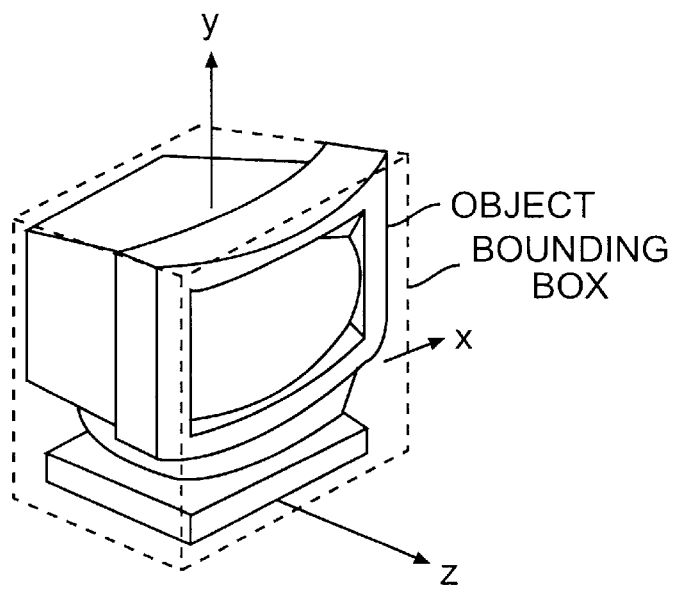
FIG. 8 is an example of action rule information.
FIG. 9 is an example of a bounding box of an object.

The motion rule information memory section 14 previously stores motion data of each object (element). FIG. 8 is an example of content of the motion rule by unit of object.

The visibility decision section 15 decides whether each object interferes with the view area according to the view information and the environment information. In this case, it is first decided whether or not the center element interferes. Then, other elements are traced along the tree-structure of the object from the center element, and in sequence, each element is decided to interfere or not. If an element is decided to interfere with the view area, the element is decided to be visible. For example, in FIG. 5 and FIG. 6, the element "BODY" is decided to be visible or not because the parent name is "WORLD". Then, each descending element, such as "HEAD" or "LEFT UPPER ARM " is decided to be visible or not because the parent name is "BODY". This decision processing is repeated by tracing along the tree-structure until at least one visible element is found among all elements of the object.

An example of the visibility decision process for an object is explained with reference to FIG. 9, FIG. 10 and FIG. 11. FIG. 9 is a schematic diagram of a bounding box of the object. In the case of the visibility decision of each element, it is decided whether or not the bounding box of each element interferes with the view area. The bounding box is a rectangular parallelepiped which circumscribes around the element and each surface of the bounding box is perpendicular to one of X,Y,Z axes of the local coordinates.

Figure 10:
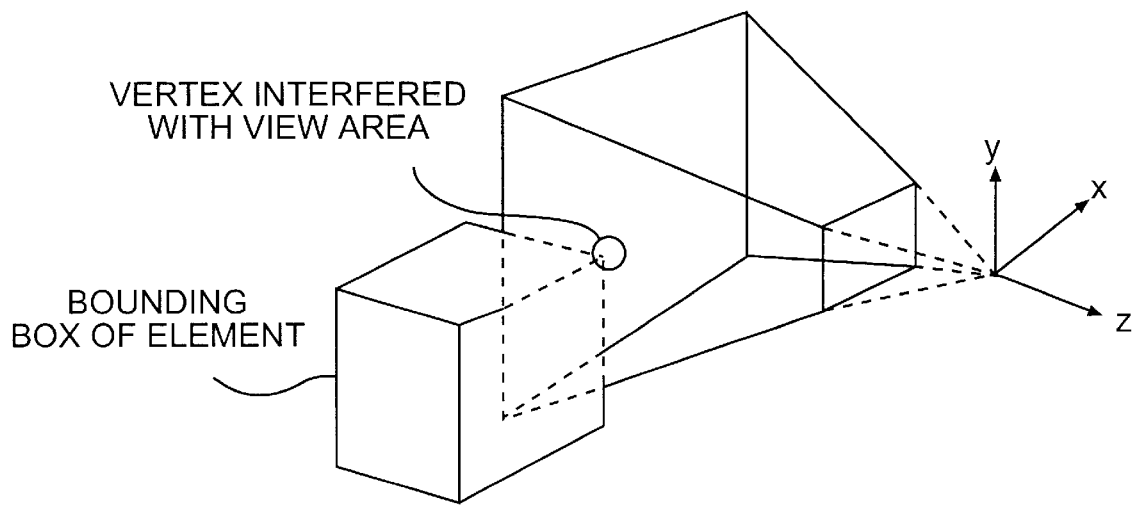
FIG. 10 is a schematic diagram of the view area and the bounding box of the object in view coordinate space.
Figure 11:
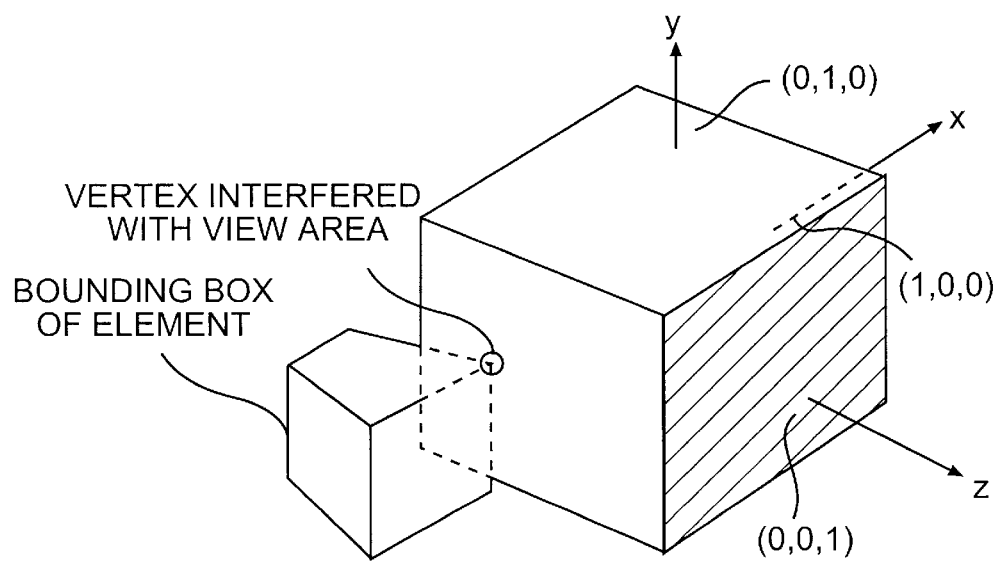
FIG. 11 is a schematic diagram of the view area and the bounding box of the object in normalized view coordinate space.

FIG. 10 is schematic diagram of the view area and the bounding box of an element. If at least one vertex of the bounding box of the element is included in the view area, the element is decided to be visible. In this case, if the view area is normalized as a cube, the decision of whether a peak of the element is included in the view area is easy to calculate. FIG. 11 is a schematic diagram of the view area and the bounding box of the object in normalized view coordinate space. The view area of a quadrangular pyramid shown in FIG. 10 is normalized as a cube ($-1<X,Y,Z<1$) in normalized view coordinates. This normalization results in the shape of the bounding box of the element becoming a quadranglar pyramid. In this case, the visibility decision of the object is that at least one vertex (x,y,z) of the bounding box of the element of the object is satisfied in normalized view coordinates as follows.

$-1<x,y,z<1$

First, the vertex coordidnate of the bounding box of the element is calculated in local coordinates. The vertex coordinate in local coordinates is transformed to that in the normalized coordinates using following equations.

VLk=Vk.Mk.V

=Vk.M'k.M'p(k) ... M'p(p( ... p(k) ... )).V

VLk: vertex coordinate in view coordinate system

Vk: vertex coordinate in local coordinate system of element k

M'i: conversion matrix from value in local coordinates of element i to value in local coordinates of its parent V: conversion matrix to value in view area coordinates P(i): element of the parent of the element i Mk: conversion matrix from value in local coordinates of the element k to value in global coordinates $$VLk = \begin{bmatrix} XLk \\ YLk \\ ZLk \\ 1 \end{bmatrix} \quad Vi = \begin{bmatrix} Xk \\ Yk \\ Zk \\ 1 \end{bmatrix}$$

M'i=Rz(ri).Rx(ei).$_R$y(ai).Tr(Xi,Yi,Zi)

V=Tr(-xv,-yv,-zv).Ry($-_\psi$)).Rx($_{31\ \phi}$)

$$Rx(Q) = \begin{bmatrix} \cos Q & -\sin Q & 0 & 0 \\ \sin Q & \cos Q & 0 & 0 \\ 0 & 0 & 1 & 0 \\ 0 & 0 & 0 & 1 \end{bmatrix}$$

$$Ry(Q) = \begin{bmatrix} \cos Q & 0 & \sin Q & 0 \\ 0 & 1 & 0 & 0 \\ -\sin Q & 0 & \cos Q & 0 \\ 0 & 0 & 0 & 1 \end{bmatrix}$$

$$Rz(Q) = \begin{bmatrix} 1 & 0 & 0 & 0 \\ 0 & \cos Q & -\sin Q & 0 \\ 0 & \sin Q & \cos Q & 0 \\ 0 & 0 & 0 & 1 \end{bmatrix}$$

$$Tr(z, y, z) = \begin{bmatrix} 1 & 0 & 0 & 0 \\ 0 & 1 & 0 & 0 \\ 0 & 0 & 1 & 0 \\ x & y & z & 1 \end{bmatrix}$$

-continued $$\psi = \tan^{-1}\left\{ \frac{\sqrt{(Zr-Zv)^2}}{\sqrt{(Xr-Xv)^2}} \right\}$$

$$\phi = \tan^{-1}\left\{ \frac{\sqrt{(yr-yv)^2}}{\sqrt{(Xr-Xv)^2 + (Zr-Zv)^2}} \right\}$$

(Xr,Yr,Zr), (Xv,Yv,Zv): view coordinate

The above equations represent the conversion from the coordinate value in the local coordinates to the coordinate value in the view coordinates before normalization.

$$Vnv = \begin{bmatrix} Xnv \\ Ynv \\ Znv \end{bmatrix}$$

$$\begin{cases} xnv = \frac{XL}{ZL} \times \cot\frac{ah}{2} \\ Ynv = \frac{YL}{ZL} \times \cot\frac{av}{2} \\ Znv = \frac{ZL - Dn}{Df - Dn} \end{cases}$$

Vnv: vertex coordinate in normalized view coordinates

VLk (XLk, YLk, ZLk): vertex coordinates in unnormalized view coordinates ah, av, Dn, Df: view information The above equations represent the normalization of the view coordinates.

Next, the motion generation section 16 calculates motion of the object according to the motion rules stored in the motion rule information memory section 14. For example, in FIG. 8, the motion of the object whose center element is "obj 1" is calculated as rotation of 30 rpm centering around the x-axis of the local coordinate space. As for the object whose center element is "human 1", the motion of "human 1" walks 30 steps, turns to the left 90 degree and waits 10 seconds while looking at "object 1" is generated.

The display section 17 draws the virtual environment as computer graphics according to the view information and the environment information. First, the center element of the object whose parent name is "WORLD" is retrieved from the environment information and other elements connecting to the center element are retrieved in sequence. Then, the center element and the other elements of the object are displayed. In this case, the peak coordinate of each element is projected to the display screen. For example, in FIG. 11, a surface including oblique lines is represented as a display screen in the normalized coordinate space. In this case, the peak coordinate (x,y,z) of each element of the object is transformed to the plot coordinate (x,y,o) on the display screen. In short, the z-value of the peak coordinate of the element is ignored because the display surface is the x-y coordinate plane.

Figure 12:
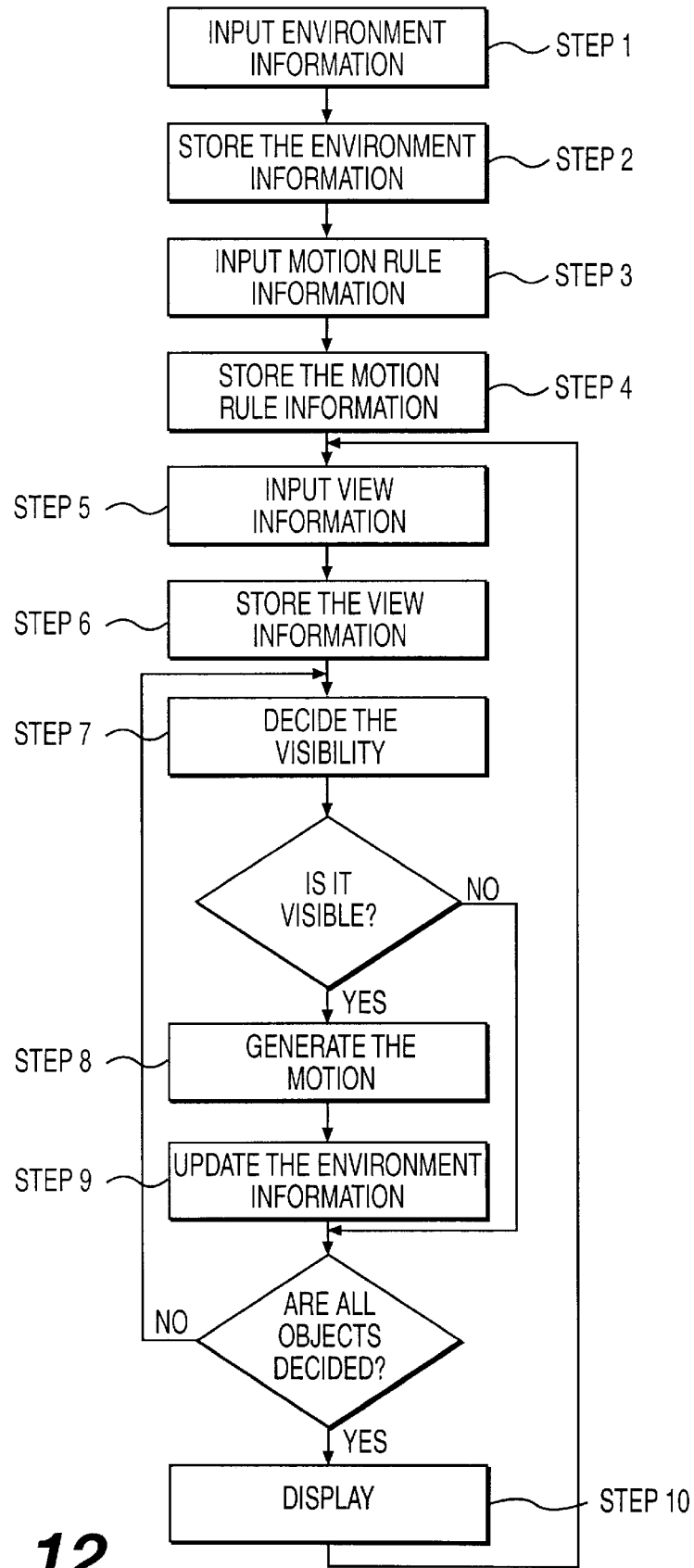
FIG. 12 is a flow chart according to the first embodiment of the present invention.

FIG. 12 is a flow chart of processing according to the first embodiment of the present invention. The processing of high-speed drawing of the first embodiment will be explained in detail with reference to FIG. 12. First, the object information and the motion rule information in virtual space are supplied to the input section 11. The object information is stored in the environment information memory section 13 and the motion rule information is stored in the motion rule information memory section 14 (step 1~4). Next, the view information describing a user's view of the virtual environment is supplied to the input section 11. The view information is stored in the view information memory section 12 (step 5,6). The visibility decision section 15 decides whether the object is included in the view area or not according to the object information and the view information (step 7). With respect to use of a decision result of the visibility decision section 15, if at least one part of the object is included in the view area, the motion generation section 14 generates motion of the object in virtual space and updates the object information stored in the environment information memory section 13 according to the generated motion information (step 8,9). If all element of the object are not in the view area, the processing of step 8 and step 9 is omitted. The processing from step 7 to step 9 is repeated for all objects in the virtual environment. Last, the object in the view area is displayed according to the object information updated in the virtual environment (step 10). Then, the processing from step 5 to step 10 is repeated because of displaying from a different view point.

Figure 13:
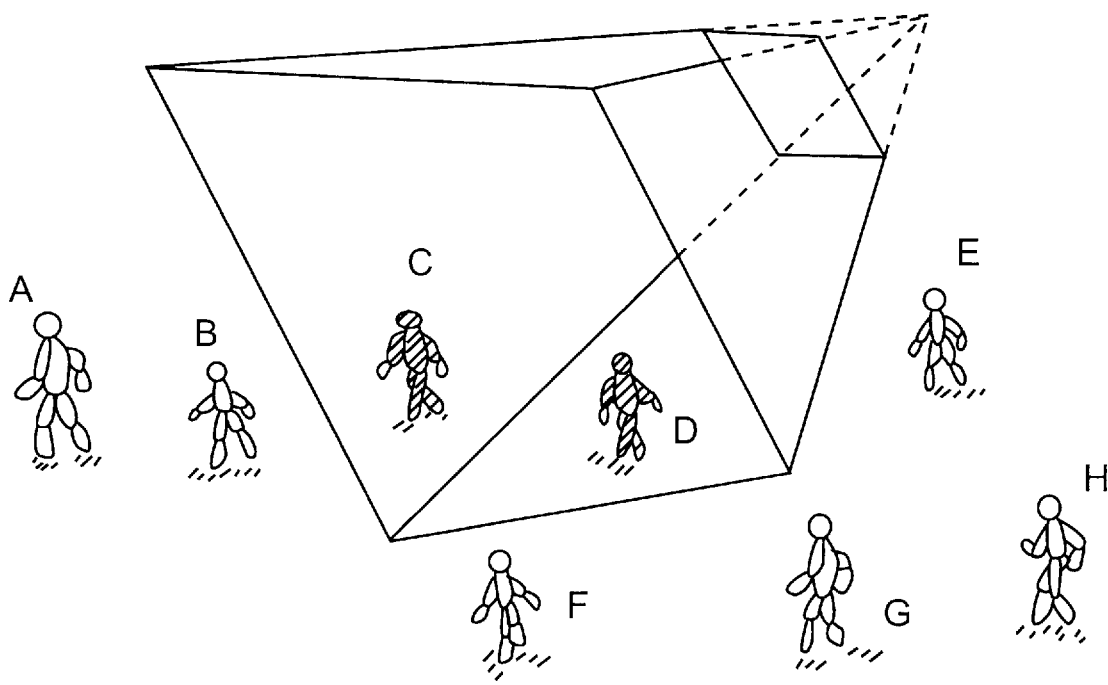
FIG. 13 is an example of the relation between many objects and the view area.

FIG. 13 is a schematic diagram of a human model moving in a virtual environment and the view area to watch the virtual environment. As for eight human models (A~H), actions of the human models (C,D) are generated because only human models (C,D) are included in the view area. Accordingly, in this case, the calculation load for generating action of two human is reduced as one-fourth in comparison with the calculation load for generating action of eight (all) humans. As a result, the object in virtual environment is displayed at high speed because the calculation of actions of objects outside the view area are omitted.

In the first embodiment, the status of motion generation of the object has one of two conditions, i.e., whether motion of the object is calculated or not. However, in a second embodiment, an attention degree is set for each object and the action generation of the object is simplified according to the attention degree. In a movie filming, there is a method by which depth of field becomes short because a leading part only of a scene is clearly visible. In this case, other parts of the scene except for the leading part get blurred on screen and motion of the other parts is not clearly visible. In the same way, the motion of a primary object to be obserbed is clearly displayed and the motions of another objects are more simply displayed since the other objects are located apart from the primary object to be obserbed. Accordingly, the time for generating motion is reduced while the natural appearance of the image is maintained.

Figure 14:
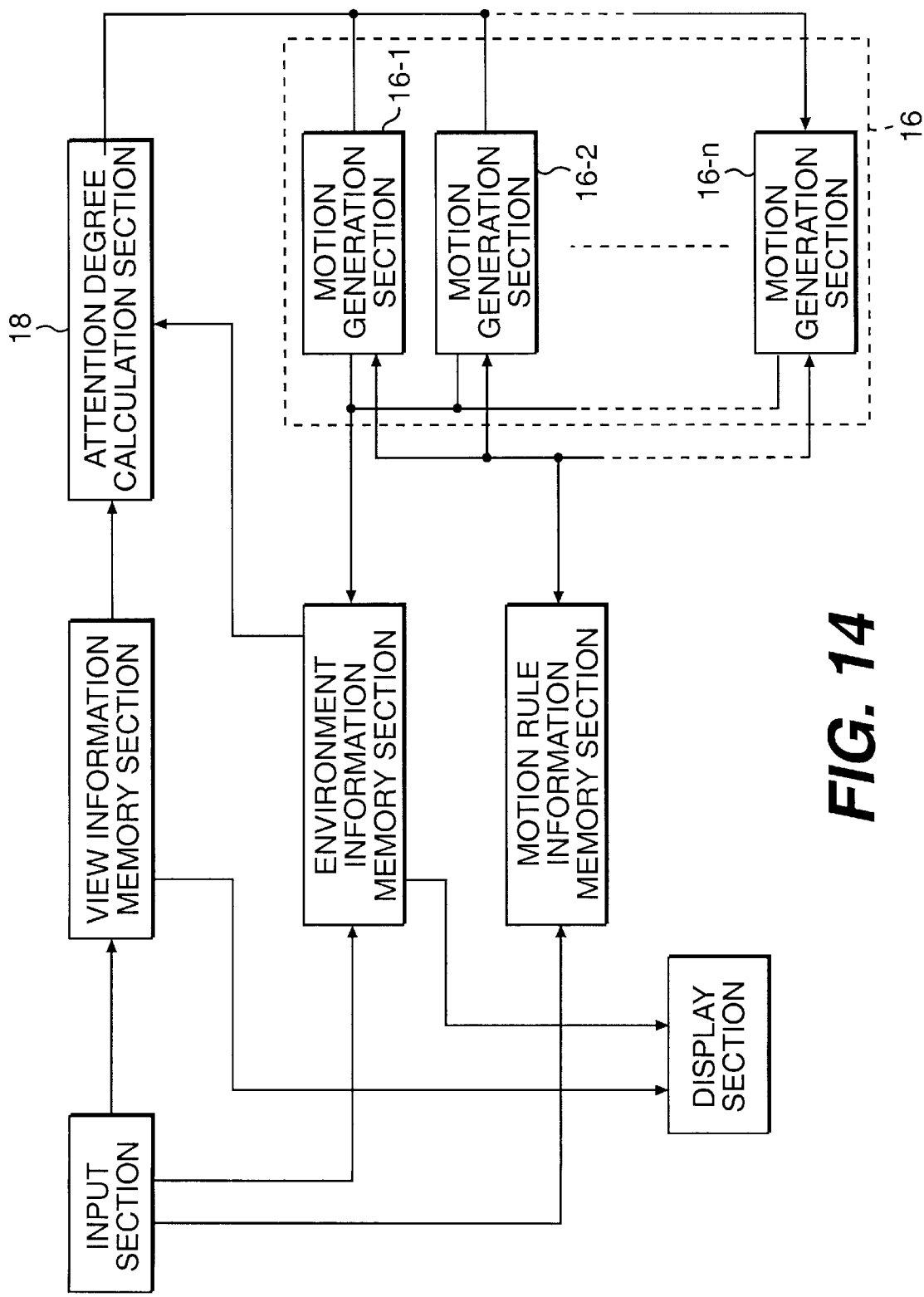
FIG. 14 is a schematic diagram of a second embodiment of the present invention.

FIG. 14 is a schematic diagram of the second embodiment of the present invention. An attention degree calculation section 18 calculates the attention degree of each object according to the following equations.

$$N = \frac{Dn \times Bv}{D}$$

$$D = \sqrt{(Xv - Xn)^2 + (Yv - Yn)^2 + (Zv - Zn)^2}$$

N: attention degree
D: distance between the viewpoint and the object
Bv: visible state value (=1(visible)/o(invisible))
Dn: distance between the viewpoint and the nearer clipping plane
(Xv,Yv,Zv): viewpoint coordinate
(Xn,Yn,Zn): coordinate of n-th object In this example, for an object located in the field of view, a large value of attention degree is set for the object if it is near to the viewpoint and a small value of attention degree is set for the object if it is far from the viewpoint. As for an object located outside the field of view, an attention degree of "O" is set for the object. The motion generation section 14 calculates the motion of the object according to the attention degree. The motion generation section includes a plurality of motion generation sections 16-1,16-2, . . . , 16-n which calculate object motion in proportion to the complexity of the action, where the complexity of motion is increased as the value of the attention degree increases. As an example, the motion calculation for a walking object (human model) will be explained. If the walking object is near to the viewpoint, a dynamic equation for each element of the walking object is solved and a torque calculation of each joint of the element is executed to balance the movement of each element for walking (motion level 1). If the walking object is more distant from the viewpoint, a rotating angle the shoulder, groin joint and knee and a move distance of the body are only calculated (action level 2). If the walking object is far from the viewpoint, the moving distance of the object is only calculated (action level 3). In the case of motion level 1, control the calculation for controlling the walking of the object is executed by unit of 1 loop. Accordingly, the calculation load for motion level 1 is the largest among the three action levels. However, a well-balanced walking motion of the object is displayed. In the case of action level 2, angle data of each joint by units of predetermined time is prepared and the rotating angle of each joint is calculated according to the angle data. The calculation load for motion level 2 is smaller than that of level 1 and each joint of the object is moved mechanically. In the case of motion level 3, the next reached position is calculated according to movement speed and calculation load for action level 3 is small.

Figure 15:
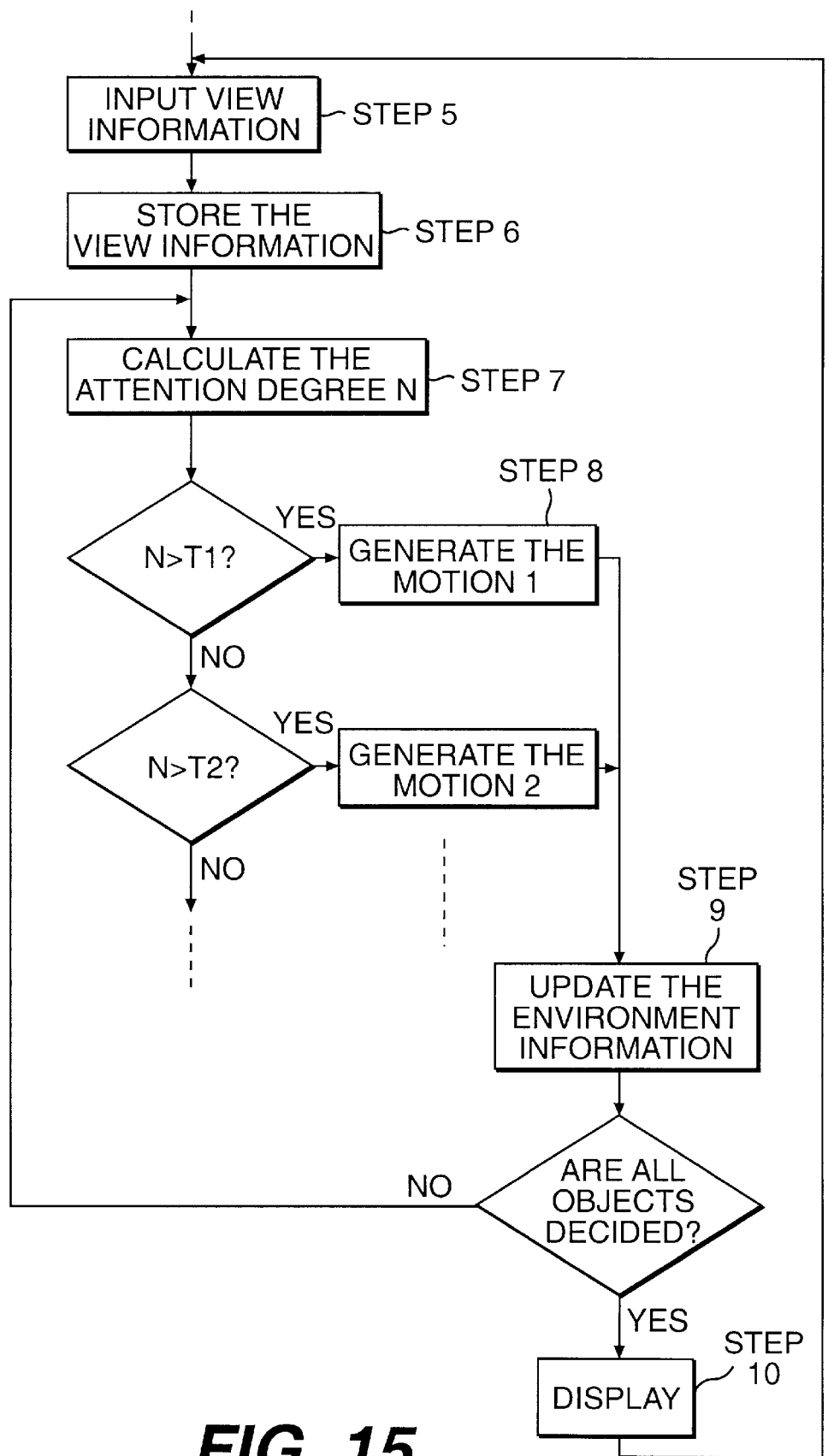
FIG. 15 is a flow chart according to the second embodiment of the present invention.

FIG. 15 is a flow chart of processing of the second embodiment. Steps 1~6 of the second embodiment are the same as those of the first embodiment in FIG. 12. Following step 6, the attention degree calculation section 18 calculates the attention degree N according to the view information and the environment information (step 7). One of the motion generation sections 1~n generates the motion of the object according to the attention degree N calculated at step 7 (step 8). Plural thresholds T1~Tn corresponding to each motion generation are previously set. The attention degree N is compared with threshold T~Tn in sequence and one of the motion generation sections 1~n is selected. Steps 9 and 10 are the same as those of the first embodiment in FIG. 12. Accordingly, in the second embodiment, the motion generation is simplified in accordance with the attention degree of each object.

Next, a modification of the second embodiment will be explained. In the modification, a method for calculating the attention degree is changed to calculate its more effective value. Therefore, the schematic diagram and the flow chart of the modification is the same as those of the second embodiment. The equation for calculating the attention degree according to the modification is as follows.

$$N = f(Nm, Np)$$
$$= \text{Max}(Nm, Np), Nm + Np, Nm \times Np, \text{etc.}$$

N: attention degree
Nm: mental attention degree
Np: physical attention degree
   Nm=g(Ci, Mi, Hi, Ri, Si)

Ci: casting of object i

= 10 (leading part)

= 5 (sub-leading part)

= 3 (supporting part)

= 1 (extra part)

Mi: complexity of action of object i
Hi: conspicuous degree of color of object i
Ri: undaily degree of object i
Si: moving speed of object i
   Np=h(D(i), A(i),O(i))
D(i): distance function of object i from viewpoint $$= \sqrt{(Xv - Xi)^2 + (Yv - Yi)^2 + (Zv - Zi)^2}$$
$$= \log\left(\sqrt{(Xv - Xi)^2 + (Yv - Yi)^2 + (Zv - Zi)^2}\right)$$

Xv,Yv,Zv: viewpoint coordinate position
Xi,Yi,Zi: object coordinate position
A(i): angle of gravity of object i from a view direction
O(i): overlap function of object i $$= \begin{cases} 0 & (\exists jA(i) = A(j), D(j) = \text{Min}(D(i), D(j))) \\ 1 & (\text{otherwise}) \end{cases}$$

Therefore, in the modification, the motion generation is simplified according to the effective attention degree based on the mental attention degree.

Figure 16:
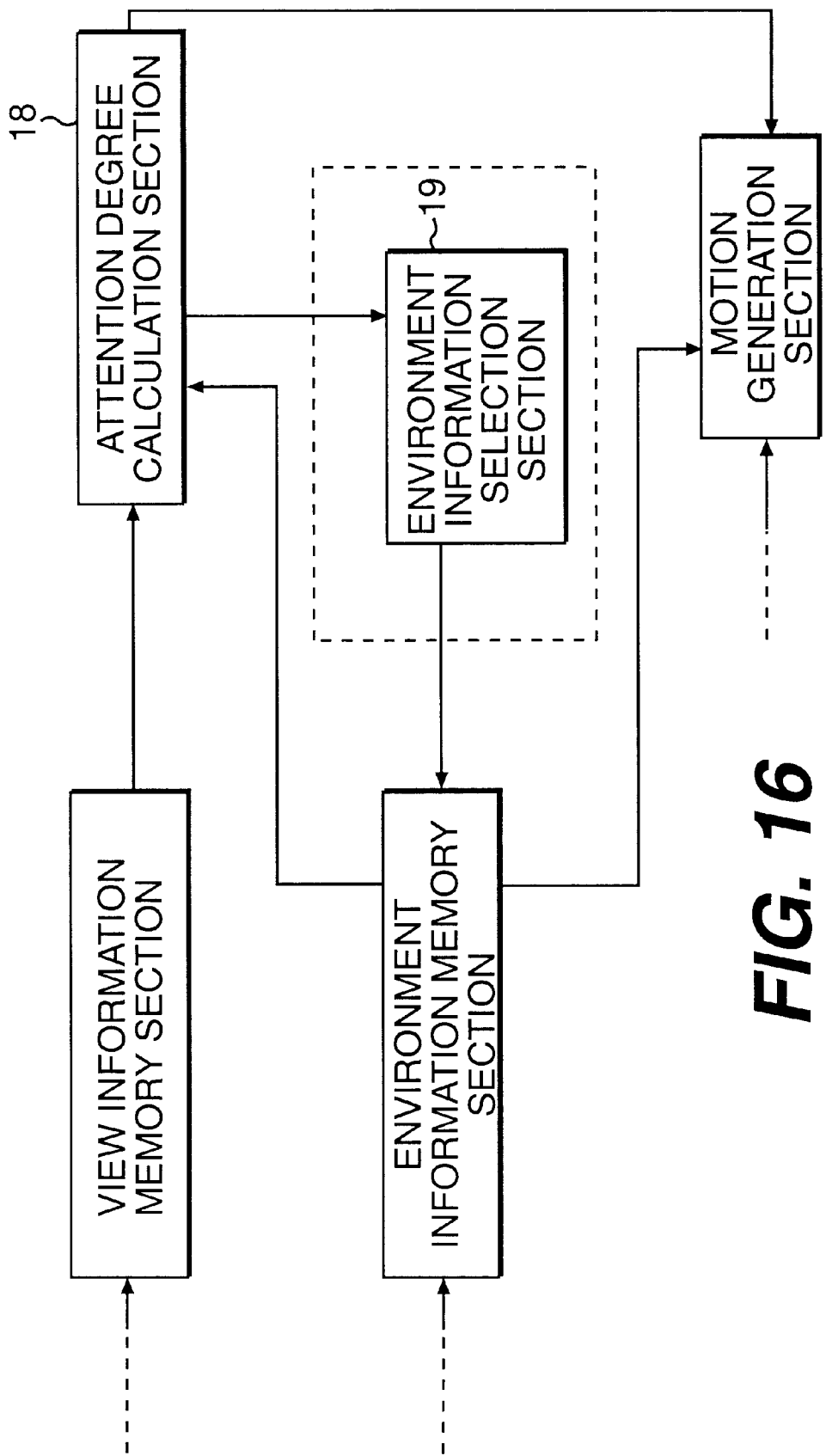
FIG. 16 is a schematic diagram of a third embodiment of the present invention.

In the case that motion of the object consists of connected plural elements, the calculation load of motion generation is reduced as the number of the elements becomes small. In the above-described embodiment, the structure of elements of the object are fixed. However, in the third embodiment, structure of elements of the objects is changed according to the attention degree. FIG. 16 is a schematic diagram of the flow control apparatus of the third embodiment, in which an environment information selection section 19 is added to the apparatus of the second embodiment. The environment information selection section 19 changes the element name of the parent in the environment information according to the attention degree. In short, the object to be watched in the view area is changed. In this case, if the value of the attention degree is low, the number of the elements of the object is changed to be small.

Figure 17:
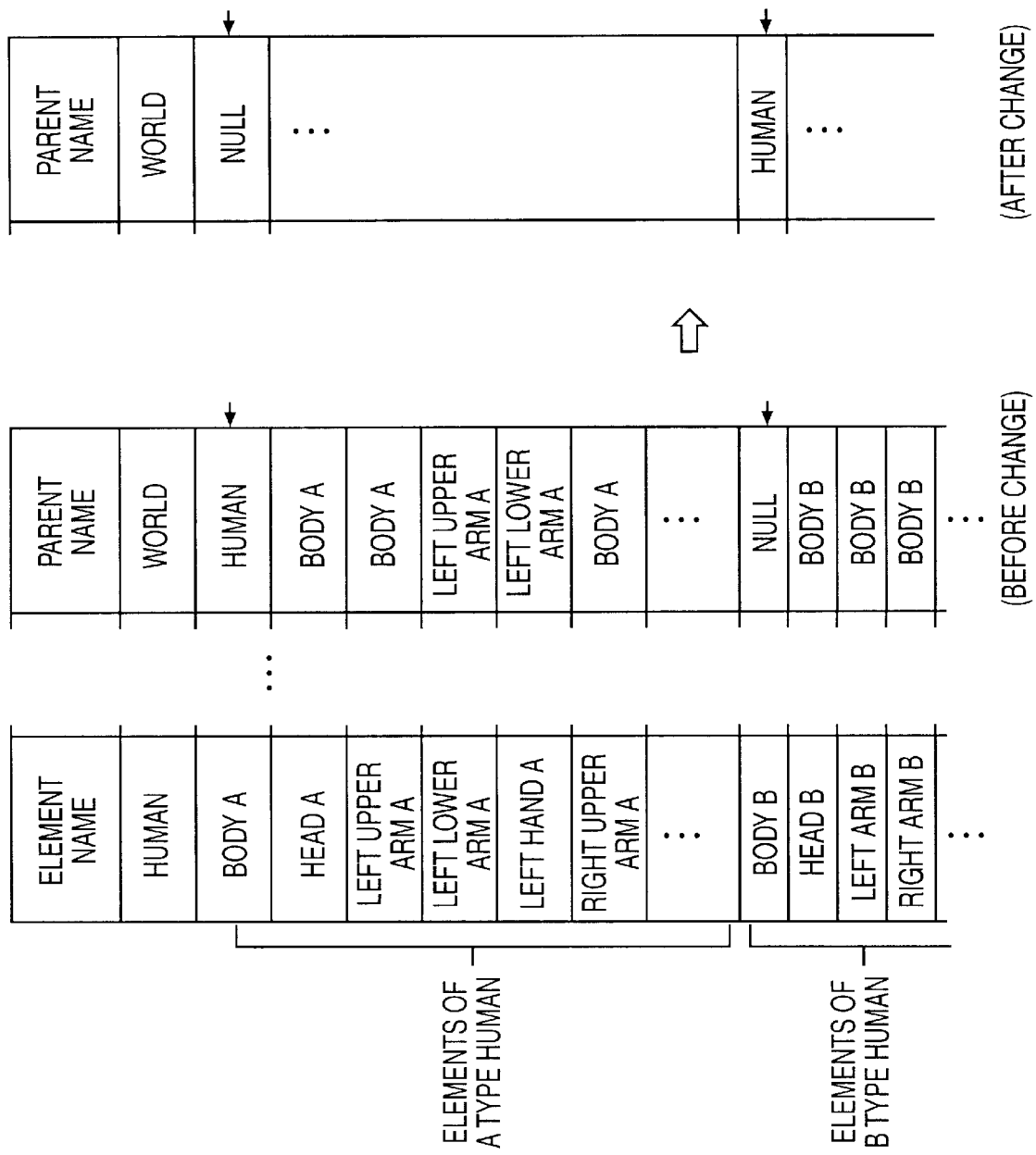
FIG. 17 is a schematic diagram of selection of the environment information.
Figure 18:
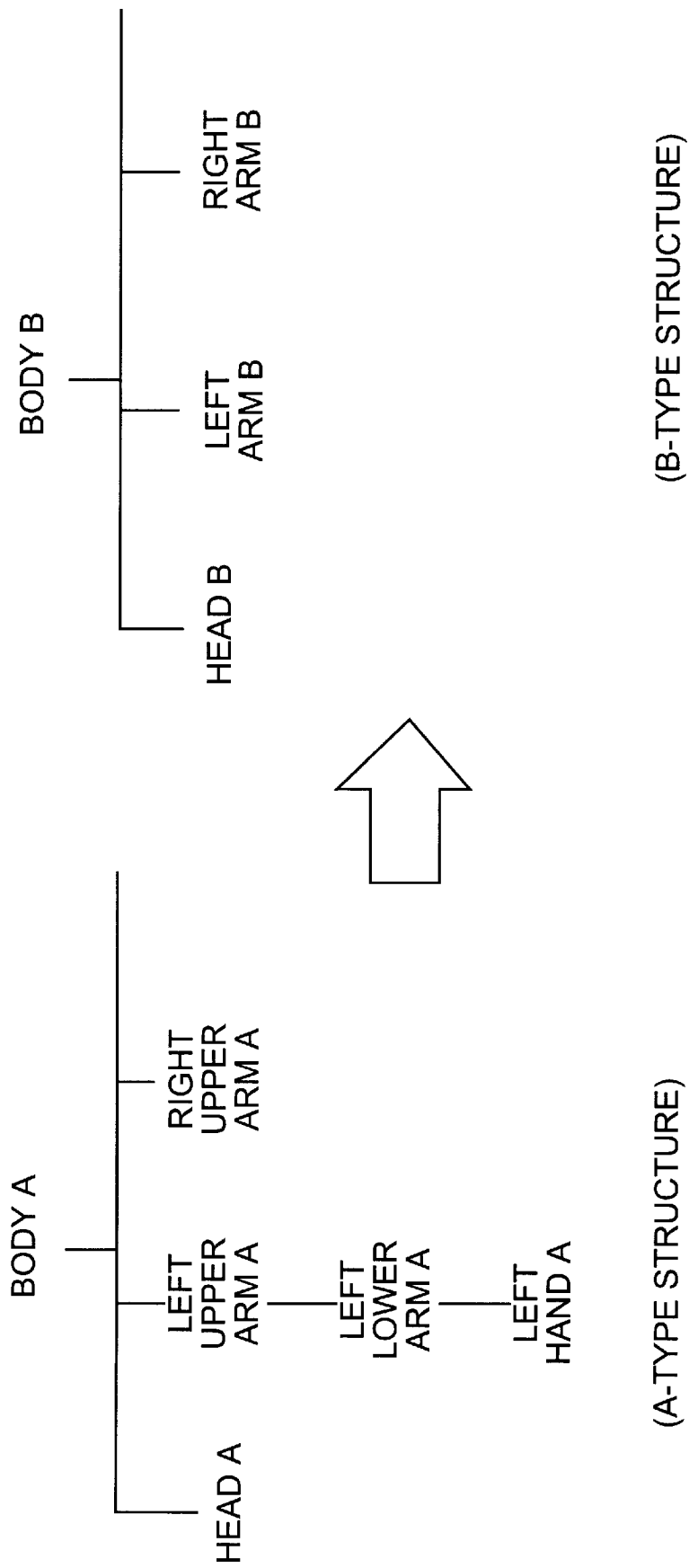
FIG. 18 is an example of a tree-structure of the object elements for selection of the environment information.
Figure 19:
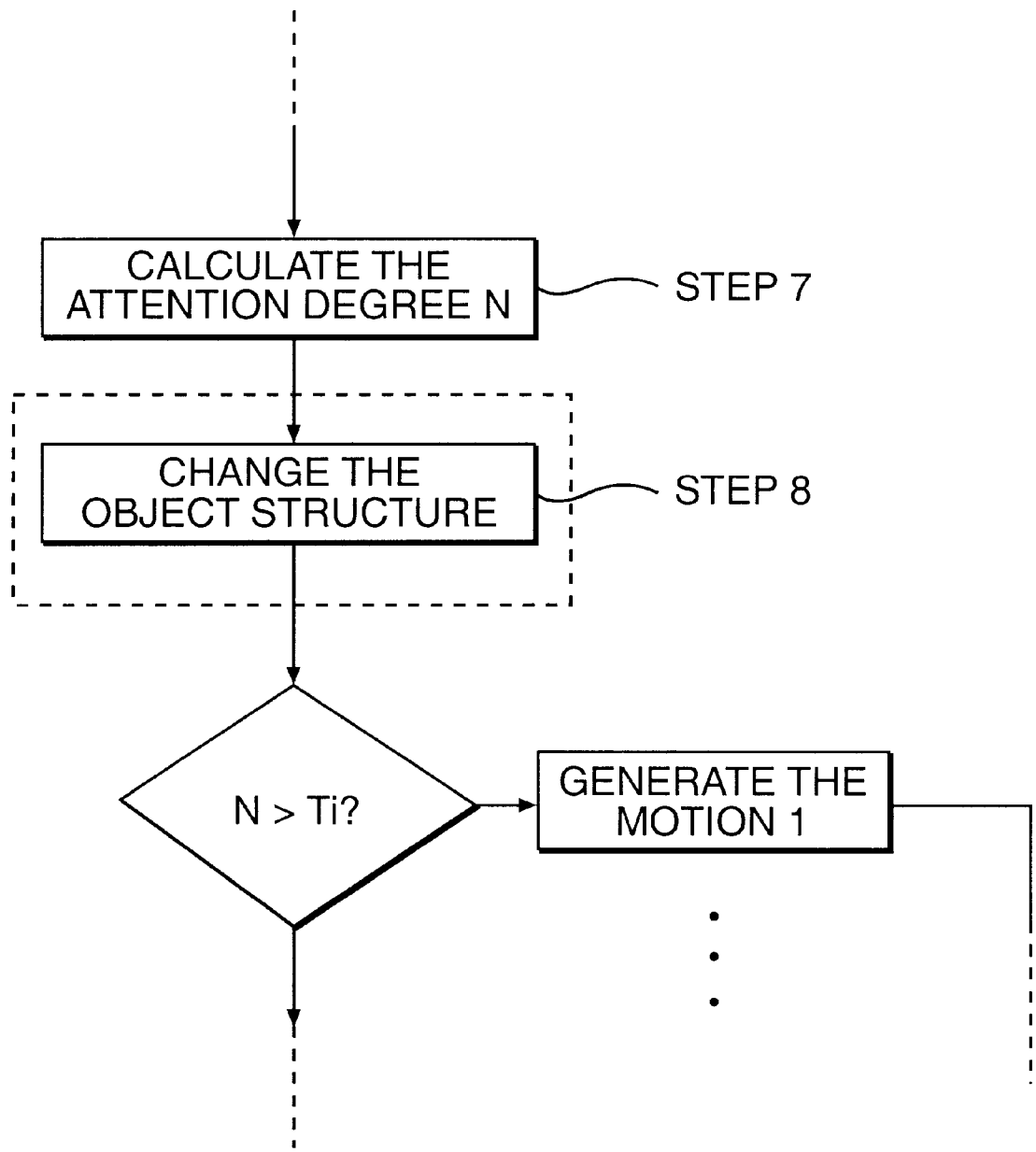
FIG. 19 is a flow chart according to the third embodiment of the present invention.

FIG. 17 is an example of change of the environment information. In FIG. 17, the elements of a B type human represent a simplified version of elements of an A type human. By changing the parent name, the structure of the human model is changed from A type to B type. FIG. 18 shows the structures of both the A type human and B type human. More particularly, "BODY A" is selected before change. The parent of "BODY A" is "HUMAN" (center-upper arrow in FIG. 17) and the parent of "BODY B" is "NULL" (center-lower arrow in FIG. 17). As a result, the human-model consists of "BODY A". After change, the parent of "BODY A" is "NULL" (right-upper arrow in FIG. 17) and parent of "BODY B" is "HUMAN" (right-lower arrow in FIG. 17). As a result, the human-model consists of "BODY B". FIG. 19 is a flow chart of processing of the third embodiment. The steps except for step 8 are same as those of the second embodiment in FIG. 15. The environment information selection section 19 changes the element name of the parent in the environment information stored in the environment information memory section (step 8). In short, the object structure is changed according to the attention degree. Accordingly, the calculation load for action generation is reduced because the object structure is changed.

In the third embodiment, plural environment information is previously prepared for one object and suitable environment information is selected according to the attention degree. However, in a modification of the third embodiment, plural objects for the same action are regarded as one crowd (group) and the environment information is changed for each crowd.

Figure 20:
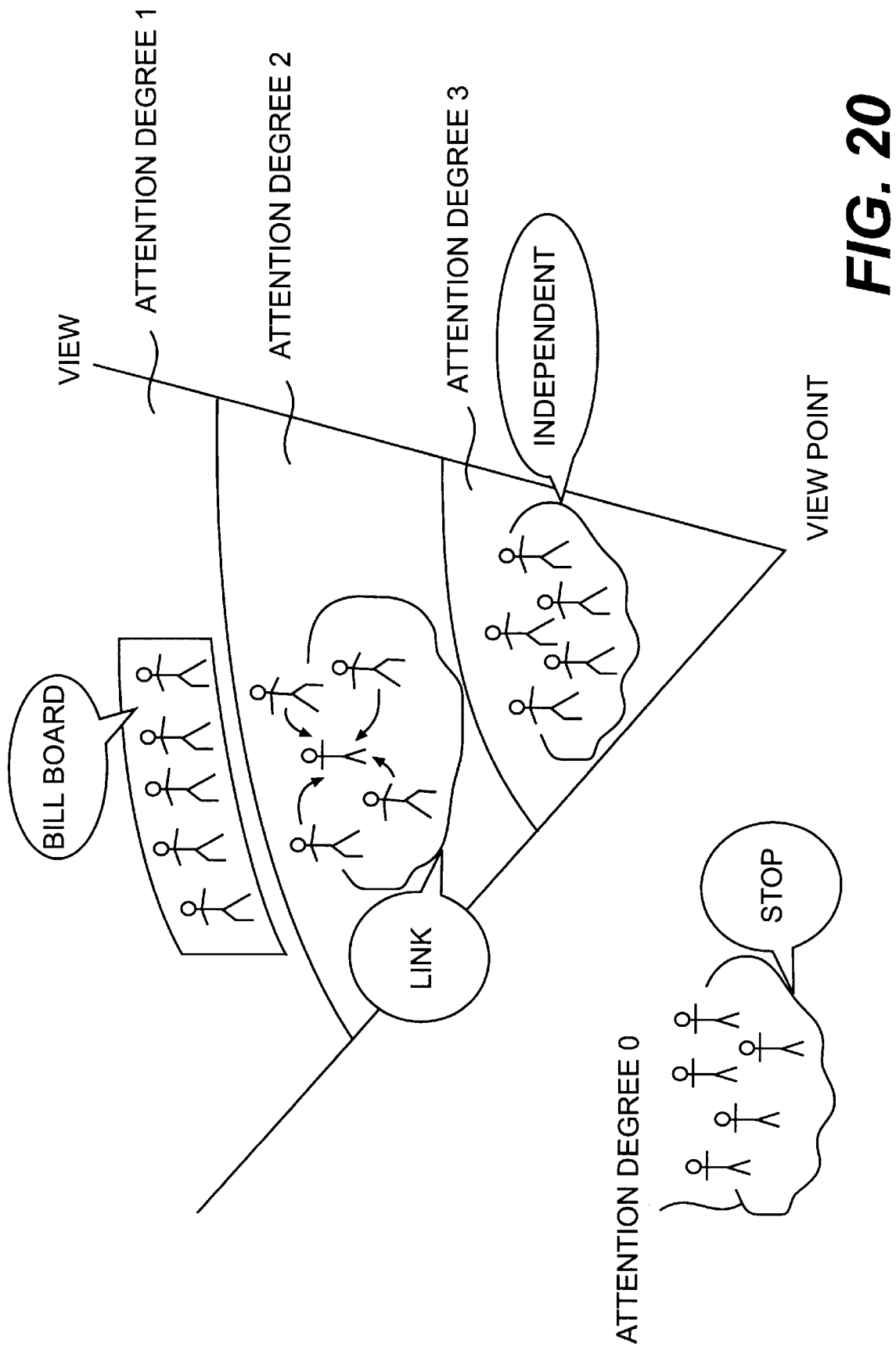
FIG. 20 is a schematic diagram of the relation between motion of a crowd and an attention degree.

FIG. 20 is a schematic diagram showing the relation between the attention degree and the motion generation of the crowd. In this example, the attention degree of the crowd becomes low as the crowd moves further from the view point. If the crowd is outside the viewpoint, the attention degree is "O". The crowd only consists of plural human models. If the attention degree is large value ("3" in FIG. 20), motion is generated for each human model of the crowd independently. If the attention degree is an intermediate value ("2" in FIG. 20), motion is generated for one human model of the crowd and the motions of the other human models of the crowd are linked to the generated motion of the one human model. In short, the calculation of motion generation for the other human models of the crowd is omitted. If the attention degree is a low value ("1" in FIG. 20), the crowd is displayed as a billboard (a background image including human-texture) and motion is not generated. If the attention degree is "O", the crowd is not displayed and action is not generated. In short, as the attention degree becomes lower, details of the motion of the crowd is lost, and motion generation is omitted.

Figure 21:
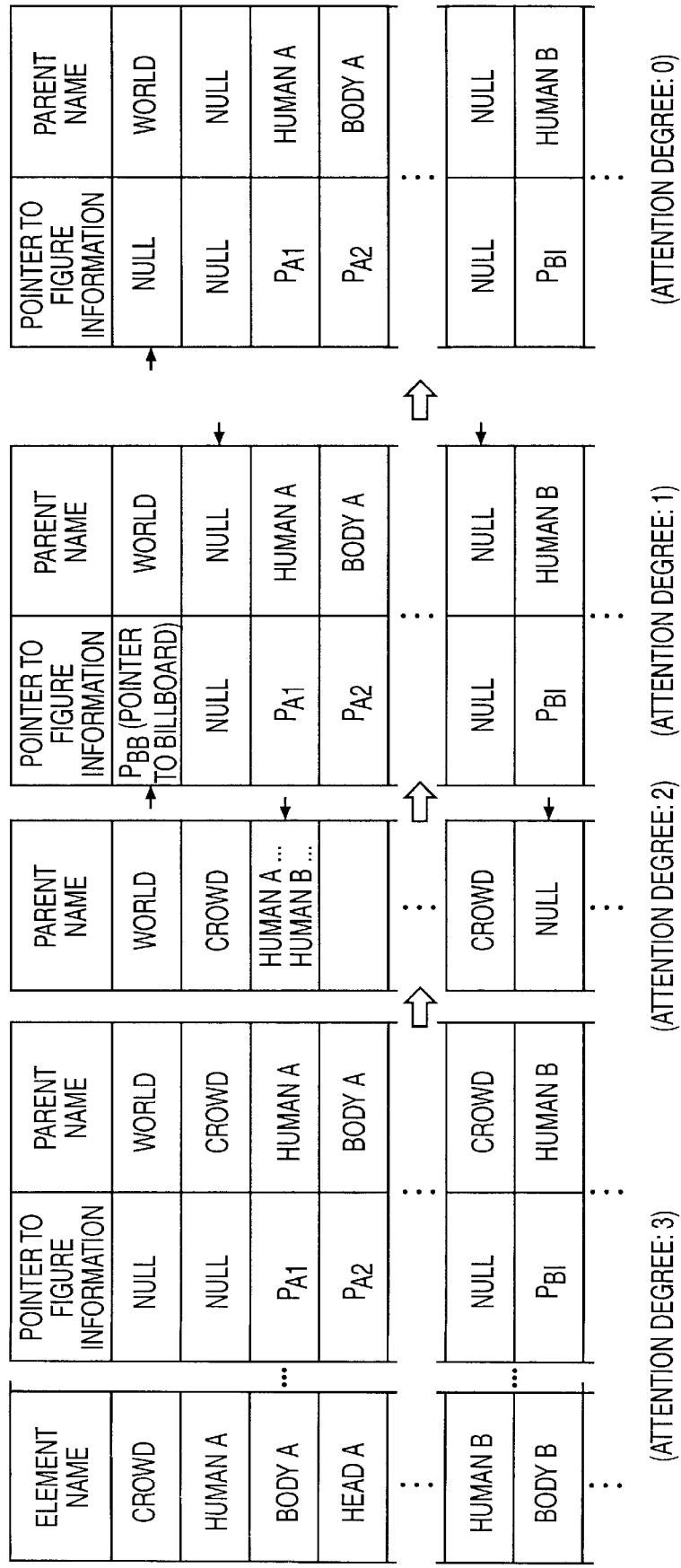
FIG. 21 is a schematic diagram of the relation between the environment information of the crowd and the attention degree.

FIG. 21 is a schematic diagram showing the relation between the attention degree and the environment information for the specific example in FIG. 20. In the case of attention degree "3", elements "HUMAN A", "HUMAN B" and so on are located under the parent element "CROWD" independently. In the case of attention degree "2", the elements "HUMAN B" and so on are linked to the element structure of the element "HUMAN A". In this case, "HUMAN B" and so on use the motion of the "HUMAN A" instead of generating motion (two arrows of the attention degree:2 in FIG. 21). In the case of attention degree "1", the elements "HUMAN A" and so on are cut off from the element "CROWD" and a pointer of "CROWD" points to figure information designates the billboard (an arrow of the attention degree:1 in FIG. 21). In this case, the figure information including "HUMAN A" and so on is replaced by one background image (billboard), and the calculation load of motion generation is greatly reduced. In the case of attention degree "O", a pointer of "CROWD" points to figure information which designates "NULL" (an arrow of the attention degree "O" in FIG. 21).

Accordingly, in the modification of the third embodiment, plural objects which move in the same motion are regarded as the crowd and motion generation is reduced as a whole for the crowd.

A memory can be used to store instructions for performing the process described above, such a memory can be a CD-ROM, Floppy Disk, etc.

What is claimed is:

1. Virtual object display apparatus, comprising:
   environment information memory means for storing environment information, including a position, a posture and a motion rule, for a plurality of objects in a virtual space, wherein the motion rule represents how each of the plurality of objects moves in the virtual space;

view information memory means for storing view information defining the extent of a view area from a viewpoint in the virtual space;

visibility decision means for determining whether each of the plurality of objects is visible from the viewpoint in accordance with the environment information and the view information, whenever motions of the plurality of objects are updated;

motion generation means for generating motion for each of the plurality of objects in the virtual space, wherein the motion of each of the objects is simplified if the object is not visible from the viewpoint, and the motion of the object is generated using the position and the posture of the object if the object is newly visible from the viewpoint after a simplified motion; and display means for displaying the motion of each of the objects visible from the viewpoint.

2. Virtual object display apparatus according to claim 1, wherein the visibility decision means deteremines the object is visible if the object is at least partially visible from the viewpoint.

3. Virtual object display apparatus according to claim 1, wherein the view information includes a viewpoint coordinate, a reference point coordinate, a horizontal view angle, a vertical view angle, a distance between the viewpoint and the nearer clipping plane and a distance between the viewpoint and the farther clipping plane in a view coordinate space in the virtual space.

4. Virtual object display apparatus according to claim 3, wherein the view area comprises a quadrangular pyramid defined by a direction from the viewpoint coordinate to the reference point coordinate extending between the nearer clipping plane and the farther clipping plane in the view coordinate space.

5. Virtual object display apparatus according to claim 4, wherein the visibility decision means includes means for defining a bounding box for a selected one of the objects, means for transforming the bounding box of the selected object in a local coordinate space to view coordinate space, means for normalizing the view area and the bounding box of the selected object in view coordinate space, and for deciding whether the bounding box of the selected object interferes with the normalized view area.

6. Virtual object display apparatus according to claim 5, wherein the motion generation means generates motion of the selected object if the selected object is decided to interfere with the normalized view area by the visibility decision means, in accordance with motion rule information of the selected object.

7. Virtual object display apparatus according to claim 6, wherein the display means displays the motion of the selected object which is projected on one surface of the normalized view area corresponding to a display surface of the display means.

8. Virtual object display apparatus according to claim 1, wherein the environment information of each object includes for each element an element name, a position, a posture, a pointer to figure information and a parent name in local coordinate space.

9. Virtual object display apparatus according to claim 5, wherein the figure information includes a pointer address, a polygon name, peak coordinates for each polygon name and color information for each polygon name.

10. Virtual object display apparatus, comprising:

environment information memory means for storing environment information, including a motion rule, for a plurality of objects in a virtual space, wherein the motion rule represents how each of the plurality of objects moves in the virtual space;

view information memory means for storing view information defining the extent of a view area from a viewpoint in the virtual space;

attention degree calculation means for calculating an attention degree for each of the plurality of objects in accordance with the environment information and the view information, wherein the attention degree is computed from a mental attention degree based on a casting of the object;

motion generation means for generating relatively complex motion for the object if the attention degree of the object is relatively high, and for generating relatively simple motion for the object if the attention degree of the object is relatively low, in accordance with the motion rule; and display means for displaying the motion of each of the objects generated by the motion generation means.

11. Virtual object display apparatus according to claim 10, wherein the attention degree is a ratio of a product of a distance between the viewpoint and the nearer clipping plane and a visible state value to a distance between the viewpoint and the object.

12. Virtual object display apparatus according to claim 10, further including environment information selection means for selecting relatively detailed elements of the object as the environment information when the attention degree of the object is relatively high, and for selecting relatively simple elements of the object as the environment information when the attention degree of the object is relatively low.

13. Virtual object display apparatus according to claim 10, wherein the motion generation means generates independent motion for each of the objects for which the attention degree is high, generates motion for one object for which the attention degree is intermediate and link there to motions of other ones of the objects for which the attention degree is intermediate, and generates a billboard image for ones of the objects for which the attention degree is low.

14. A virtual object display method, comprising the steps of:

storing environment information, including a position, a posture and a motion rule, for a plurality of objects in a virtual space, wherein the motion rule represents how each of the plurality of objects is moving in the virtual space;

storing view information defining the extent of a view area in the virtual space;

deciding whether each of the plurality of objects is visible in the view area in accordance with the environment information and the view information, whenever motions of the plurality of objects are updated;

generating motion for each of the plurality of objects in the virtual space, wherein the motion of the object is simplified if the object is not visible in the view area, and the motion of the object is generated using the position and the posture of the object if the object is newly visible from the viewpoint after a simplified motion; and displaying the motion of each of the objects visible in the view area.

15. A virtual object display method, comprising the steps of:

storing environment information, including a motion rule, for a plurality of objects in a virtual space, wherein the motion rule represents how each of the plurality of objects moves in the virtual space;

storing view information defining the extent of a view area in the virtual space;

calculating an attention degree for each of the plurality of objects in accordance with the environment information and the view information, wherein the attention degree is computed from a mental attention degree based on a casting of the object;

generating relatively complex motion for the object if the attention degree of the object is relatively high, and relatively simple motion for the object if the attention degree of the object is relatively low, in accordance with the motion rule; and displaying the motion of each of the objects generated at the generating step.

16. A computer-readable memory comprising:

instruction means for causing a computer to store environment information, including a position, a posture and a motion rule, for a plurality of objects in a virtual space, wherein the motion rule represents how each of the plurality of objects moves in the virtual space;

instruction means for causing a computer to store view information of the extent of a view area in the virtual space;

instruction means for causing a computer to determine whether each of the plurality of objects is visible in the view area in accordance with the environment information and the view information, whenever motions of the plurality of objects are updated;

instruction means for causing a computer to generate motion for each of the plurality of objects in the virtual space, wherein the motion of the object is simplified if the object is not visible in the view area, and the motion of the object is generated using the position and the posture of the object if the object is newly visible from the viewpoint after a simplified motion; and instruction means for causing a computer to display the generated motion of each of the objects visible in the view area by the visibility determination.

17. A computer-readable memory comprising:

instruction means for causing a computer to store environment information, including a motion rule, for a plurality of objects in a virtual space, wherein the motion rule represents how each of the plurality of objects moves in the virtual space;

instruction means for causing a computer to store view information defining the extent of a view area in the virtual space;

instruction means for causing a computer to calculate an attention degree for each of the plurality of objects in accordance with the environment information and the view information, wherein the attention degree is computed from a mental attention degree based on a casting of the object;

instruction means for causing a computer to generate relatively complex motion for the object if the attention degree of the object is relatively high, and relatively simple motion for the object if the attention degree of the object is relatively low, in accordance with the motion rule; and instruction means for causing a computer to display the generated motion of each of the objects.

* * * * *

UNITED STATES PATENT AND TRADEMARK OFFICE
CERTIFICATE OF CORRECTION

PATENT NO. : 5,952,993
DATED : September 14, 1999
INVENTOR(S) : Keigo MATSUDA et al.

It is certified that error appears in the above-identified patent and that said Letters Patent is hereby corrected as shown below:

Title Page, Item [57], in the Abstract, line 6, "determine" should read --determines--; and line 9, "An motion" should read --A motion--.

*Title Page, in the Attorney, Agent, or Firm, line 2, "Garrett," should read --Garrett &--.

Claim 5, col. 11, line 43, "in view" should read --to view--.

*Claim 9, col. 11, line 64, "claim 5" should read --claim 8--.

Signed and Sealed this

Twenty-seventh Day of June, 2000

Attest:

Q. TODD DICKINSON

Attesting Officer

Director of Patents and Trademarks